(12) United States Patent
Leinonen (10) Patent No.: US 10,598,195 B2
(45) Date of Patent: Mar. 24, 2020

(54) ROTARY ACTUATOR, CONVERTING ACTUATOR AND METHOD FOR PRODUCING ROTATION

(71) Applicant: HYDROLINE OY, Vuorela (FI)

(72) Inventor: Manu Leinonen, Vuorela (FI)

(73) Assignee: HYDROLINE OY, Vuorela (FI)

( * ) Notice: Subject to any disclaimer, the term of this patent is extended or adjusted under 35 U.S.C. 154(b) by 92 days.

(21) Appl. No.: 15/528,365

(22) PCT Filed: Nov. 19, 2015

(86) PCT No.: PCT/FI2015/050806
§ 371 (c)(1),
(2) Date: May 19, 2017

(87) PCT Pub. No.: WO2016/079386
PCT Pub. Date: May 26, 2016

(65) Prior Publication Data
US 2017/0363117 A1    Dec. 21, 2017

(30) Foreign Application Priority Data
Nov. 20, 2014   (FI) .................................... 20146014

(51) Int. Cl.
*F15B 15/06*     (2006.01)
*F15B 11/18*     (2006.01)
*F16H 27/02*     (2006.01)

(52) U.S. Cl.
CPC .......... *F15B 15/063* (2013.01); *F15B 11/186* (2013.01); *F15B 15/068* (2013.01); *F16H 27/02* (2013.01)

(58) Field of Classification Search
CPC .... F15B 15/063; F15B 11/186; F15B 15/068; F04B 35/04; F16H 27/02
See application file for complete search history.

(56) References Cited

U.S. PATENT DOCUMENTS

| | | | |
|---|---|---|---|
| 2,791,128 | A | 5/1957 | Geyer et al. |
| 2,806,450 | A | 9/1957 | Geyer |

(Continued)

FOREIGN PATENT DOCUMENTS

| | | |
|---|---|---|
| CN | 201963828 U | 9/2011 |
| EP | 2 246 565 A1 | 11/2010 |

(Continued)

OTHER PUBLICATIONS

The extended European Search Report dated Jul. 6, 2018, by the European Patent Office in corresponding European Application No. 15860141.9. (10 pages).

(Continued)

*Primary Examiner* — Abiy Teka
(74) *Attorney, Agent, or Firm* — Buchanan Ingersol & Rooney PC (57) ABSTRACT

The invention relates to a rotary actuator, converting actuator and method for producing rotation. The rotary actuator includes at least two rotation units for producing stepped angular displacements (Rs). The rotation unit includes a cylinder for producing linear movement (L) and a converter for converting the linear movement to rotation. The stepped rotary movements of the rotation units are transmitted by transmission elements to an output shaft.

19 Claims, 4 Drawing Sheets

(56) References Cited

U.S. PATENT DOCUMENTS

| | | | |
|---|---|---|---|
| 4,375,304 A | | 3/1983 | Schopper |
| 5,549,013 A | | 8/1996 | Kimbara |
| 5,577,436 A | * | 11/1996 | Kimbara ............... F15B 15/068 |
| | | | 91/170 R |
| 6,019,026 A | | 2/2000 | Williams |

FOREIGN PATENT DOCUMENTS

| | | | |
|---|---|---|---|
| JP | | 3432560 B2 | 8/2003 |
| WO | WO 2009/003462 A2 | | 1/2009 |

OTHER PUBLICATIONS

Office Action dated May 28, 2018, by the Chinese Patent Office in corresponding Chinese Patent Application No. 201580073224.8. (6 pages).

International Search Report (PCT/ISA/210) dated Feb. 16, 2016, by the Finnish Patent Office as the International Searching Authority for International Application No. PCT/FI2015/050806.

Written Opinion (PCT/ISA/237) dated Feb. 16, 2016, by the Finnish Patent Office as the International Searching Authority for International Application No. PCT/FI2015/050806.

Search Report dated Jun. 2, 2015, by the Finnish Patent Office for Application No. 20146014.

\* cited by examiner

ROTARY ACTUATOR, CONVERTING ACTUATOR AND METHOD FOR PRODUCING ROTATION

BACKGROUND OF THE INVENTION

The invention relates to a rotary actuator which is pressure medium operated and comprises at least one pressure medium cylinder. Axial movement produced by the cylinder is converted into rotation movement by means of converting means.

The invention further relates to a method for producing rotation movement and to a converting actuator.

The field of the invention is defined more specifically in the preambles of the independent claims.

Rotation movement may be generated by means of different pressure medium operated actuators, such as hydraulic motors and rotary actuators. Typically the actuators producing rotation comprise rotating vanes, which have shown to contain some disadvantages.

BRIEF DESCRIPTION OF THE INVENTION

An object of the invention is to provide a novel and improved rotary actuator and method for producing rotation. Further, an object of the invention is to provide a novel and improved converting actuator.

The rotatory actuator according to the invention is characterized by the characterizing features of independent first apparatus claim.

The method according to the invention is characterized by the characterizing features of independent method claim.

The converting actuator according to the invention is characterized by the characterizing features of independent second apparatus claim.

An idea of the disclosed solution is that the rotary actuator comprises two or more rotation units for producing stepped angular displacements which are transmitted to one common output shaft. The rotation units are controlled selectively thereby allowing several different rotary movements to be generated by the rotary actuator. The selected rotary actuators may be controlled individually for producing individual stepped angular displacements. Each of the rotation unit comprises a pressure medium cylinder or device for producing axial movement and a converting arrangement for converting the axial movement of the cylinder or device into angular displacement. The two or more rotation units of the rotary actuator are connected to each other by rotation transmission elements configured to transmit rotation between the rotation units. Thus, the rotation units are series connected regarding the produced rotation. The stepped rotary movements produced selectively by means of one or more of the rotation units of the rotary actuator are transmitted by rotation transmission elements to the output shaft.

An advantage is that the disclosed solution provides improvements to production of desired angular displacements of the output shaft. By controlling selectively the rotation units varying notary movements may be produced. The pressure medium cylinders of the rotation units are easily controlled. Further, the structure of the cylinders is durable, and wear resistant. An additional advantage is that sealing of the cylinders may be tight whereby leaks may be low and efficiency of the rotation units may be high. The cylinders of the rotation units are easy to dimension so that desired and sufficiently great forces may be produced. The use of cylinder may ensure that torques having sufficient magnitudes may be generated.

According to an embodiment, the operation of the pressure medium cylinders of the notary actuator is independently controllable. Thus, the rotation units may be series connected for transmitting the generated rotation, but the cylinders of the rotation units may be controlled and actuated individually for producing desired stepped rotary movements.

According to an embodiment, pistons of the pressure medium cylinders of the rotary actuator are configured to move in an axial direction defined by the axial direction of the output shaft of the rotary actuator. In other words, the cylinders are on the same axial line with the output shaft or they are parallel with longitudinal axis of the output shaft.

According to an embodiment, the pressure medium cylinders of the rotary actuator are provided with two fixed operational positions, an extreme shortened first operational position and an extended second operational position, whereby the cylinders are without any intermediate positions between the extreme operational positions. Thereby, each of the cylinders is configured to produce only two stepped angular displacements. Controlling of such two-position cylinder is simple and requires no position sensing measuring or feed-back control. The total number of possible angular displacements of the rotary actuator may be determined by formula $2^n$, wherein n is number of cylinders of the rotary actuator. When the rotary actuator comprises two rotation units the total number of stepped rotary movements is four, and when three rotation units are implemented eight different angular displacements may be produced, for example.

According to an embodiment, the rotary actuator comprises two or more pressure medium cylinders, which are all arranged on a same axial line. Then, the structure may be compact and occupy little space in side direction.

According to an embodiment, the rotary actuator comprises two or more pressure medium cylinders, which are arranged successively on the same axial line.

According to an embodiment, the rotary actuator comprises two or more pressure medium cylinders, which are all arranged on the same axial line. Further, at least two of the pressure medium cylinders of the rotary actuator are arranged at least partly within each other. Thereby, the rotary actuator may comprise at least one outer cylinder comprising a central inner space and at least one inner cylinder, which is located at least partly inside the inner space of the outer cylinder. Thus, the outer and inner cylinders may be arranged telescopically. An advantage of this embodiment is that the rotary actuator has a compact structure and may be relatively short.

According to an embodiment, the rotary actuator comprises several rotation units. Two or more rotation units are arranged coaxially within each other. In addition to, the rotary actuator comprises one or more additional rotation units arranged on the same axial line with the set of two or more coaxial rotation units. The one or more additional rotation units are located one after each other and consecutively relative to the set of coaxially arranged rotation units.

According to an embodiment, the rotary actuator comprises at least two parallel rotation units. The parallel configuration comprises two or more adjacent rotation units which are not located on the same axial line.

According to an embodiment, the rotary actuator comprises several rotation units. Configuration of the rotary actuator may comprise rotation units arranged one after each other and/or parallel and/or within each other. Thus, the rotary actuator may be composed by using several structural alternatives.

According to an embodiment, the rotary actuator comprises two or more rotation units which are configured to produce equal angular displacements. Thus, the configuration of the rotary actuator may comprises two or more similar rotation units being series connected and selectively operable for generating desired several stepped rotary movements.

According to an embodiment, the rotary actuator comprises two or more rotation units which are configured to produce angular displacements with differing magnitudes. Thus, the configuration of the rotary actuator may comprise two or more rotation units differing from each other and being series connected and selectively operable for generating desired several stepped rotary movements.

According to an embodiment, the rotary actuator comprises several rotation units. Each rotation unit of the rotary actuator is configured to produce Independently specific angular displacement with different magnitude compared to angular displacements of other rotation units.

According to an embodiment, the rotary actuator comprises several succeeding rotation units, which ere configured to produce independently specific angular displacement with different magnitude compared to angular displacements of other rotation units. Furthermore, angular displacement, of a following rotation unit is dimensioned to be half of the angular displacement of a preceding rotation unit. The rotation units are configured to be controlled independently and according to binary control principles in order to produce different angular displacements. The control system may comprise a computer or processor for controlling pressure medium valves according to the binary control principles for producing desired stepped rotary movements.

According to an embodiment, the rotary actuator comprises two or more rotation units. Each rotators unit of the rotary actuator is configured to produce specific angular displacement. Thus, each rotation unit may produce different magnitude of rotation compared to other rotation units. In order to produce differing rotation movements, stroke lengths of the pressure medium cylinders of the rotation units may be dimensioned to be different. By means of varying the stroke lengths different angular displacements may be generated for the output shaft.

According to an embodiment, the rotary actuator comprises two or more rotation units. Each rotation unit of the rotary actuator is configured to produce specific angular displacement. Thus, each rotation unit may produce different magnitude of rotation compared to other rotation units. In order to produce differing rotation movements, the convening arrangements of the rotation units may be different. The convening arrangements are configured to convert the produced axial movement to angular displacement according to their converting ratio. In order to produce different angular displacements the rotary actuator comprises at least two converting arrangements provided with differing convening ratios. Basic structures and operating principles of the converting arrangements may be similar or may differ from each other. Additionally, the cylinders of the rotation units may be dimensioned to compensate for the differing converting ratios whereby substantially similar torque may be produced by the relation units of the rotary actuator.

According to an embodiment, the rotary actuator comprises two or more rotation units provided with differing converting ratios. The converting arrangements of the rotation units comprise mating surfaces provided with pitch angles, which determine the converting ratios. Thus, the converting ratios of the converting arrangements may be influenced by dimensioning of the pitch angles. At least two rotation units of the rotary actuator are provided with specific pitch angles in order to produce different angular displacements. Relative axial movements between the mating surfaces of the converting means produce rotary movements.

According to an embodiment, the converting arrangements of the rotation units comprise screw surfaces provided with pitch angles, which determine the converting ratios. Alternatively, the converting arrangements may comprise helical splines or helical surfaces, which are also provided with pitch angles.

According to an embodiment, the converting arrangement may comprise a helical spline or helicoidal groove in a first mating surface and a pin or corresponding protruding guide element in a second mating surface. The pin is engaged by the helical spline. Thereby, relative axial movement between the pin and the helical spline may convert the axial movement to rotation and vice versa. The converting ratio may be influenced by dimensioning pitch angle of the helical spline.

According to an embodiment, the rotary actuator comprises at least two pressure medium cylinders provided with working pressure surfaces. Size of surface areas of the working pressure surfaces of the pressure medium cylinders may be dimensioned to be different for influencing the generated force.

According to an embodiment, the at least two rotation units provided with differing converting ratios of the converting arrangements are configured to generate equal or substantially equal torques. The torques of the rotation units provided with differing converting ratios are compensated for by dimensioning size of surface areas of working pressure surfaces of the pressure medium cylinders relative to the converting ratios.

According to an embodiment, the rotary actuator comprises one single frame inside which at least two rotation units are arranged.

According to an embodiment, the rotary actuator comprises one single frame inside which all the rotation units are arranged.

According to an embodiment, the frame of the rotary actuator comprises at least two frame parts, and inside each frame part is at least one rotation unit. The frame parts are arranged axially one after each other and between the successive frame parts are transmission means for transmitting produced angular displacements.

According to an embodiment, the pressure medium cylinders are hydraulically operable.

According to an embodiment, the pressure medium cylinders are operable by means of pressurized gas, such as compressed air.

According to an embodiment, the pressure medium cylinders comprise first pressure spaces and second pressure spaces, whereby feed and discharge of pressure medium to and away the pressure spaces is configured to produce axial movement. Thus, the cylinders are double-acting cylinders.

According to an embodiment, the pressure medium cylinders comprise first pressure spaces effective in first directions of movements of the cylinders and spring elements effective in opposite second directions of movement. Thus, the cylinders are single-acting cylinders.

According to an embodiment, the rotary actuator is configured to produce axial movement for the output shaft in addition to rotary movement. Thus, the output shaft is bearing mounted axially movably. At least part of the generated axial movement of one or more rotation units of the rotary actuator may be transmitted through the transmission means to the output shaft. This embodiment may be useful in situations where simultaneous rotation and axial movement is needed. Thus, the embodiment may be used when a need exists for opening or closing machine components provided with threads, for example.

Further, in an alternative solution, basic operating principle and structure of the disclosed rotary actuator may be utilized to convert, input rotation and torque directed to the output shaft into axial movement in two or more rotation units of the rotary actuator or converting actuator. Thus, the initial input rotation and torque is in this implementation generated external to the rotary actuator. The axial movement converted from the rotary movement may be further converted into pressure energy in pressure spaces of the rotation units and may be recovered. Furthermore, the recovered pressure energy may be converted back to axial movement and angular displacements so that the output shaft may be rotated backward when the initial external torque directed to the shaft no longer exists. The rotary actuator may comprise one or more rotary units provided with piston accumulators. The piston accumulator comprises a pressure space limited by a piston movable inside a cylinder space, and the pressure space being pre-charged with pressure medium, such as pressurized gas.

The above-disclosed embodiments can be combined to form suitable solutions provided with necessary features disclosed in this presentation.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
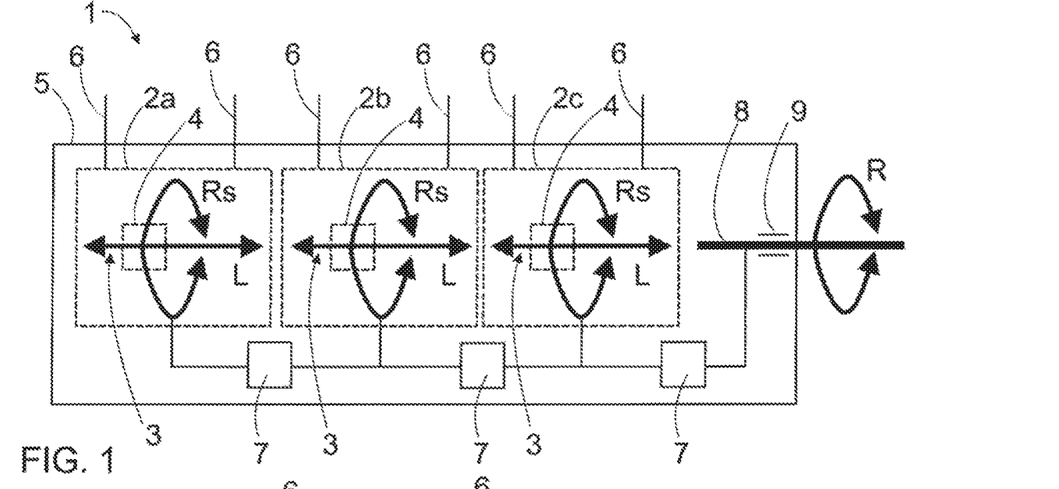
FIG. 1 is a schematic side view of a rotary actuator comprising several rotation units integrated inside one frame part.

FIG. 1 shows in a simplified manner a rotary actuator 1 by means of which rotation R may be generated. The rotary actuator 1 comprises two, three or more rotation units 2a-2c, each of which comprises a pressure medium cylinder 3 for producing axial movement L and converting means 4 for converting the axial movement to angular displacement or stepped rotary movement Rs. Number of the rotation units 2 may be selected according to the need. The rotary actuator 1 may comprise a frame 5 for supporting the rotation units 2a-2c. The rotation units 2 may be arranged inside the frame 5. The rotary actuator 1 is connected to a hydraulic system and comprises needed pressure medium ducts 8 for directing pressure medium to the cylinders 3 and away from them. The rotary actuator 1 may also comprise needed control means such as valves and other control elements for controlling the flows of the pressure medium. The rotary actuator 1 may be hydraulically or pneumatically operated. The rotary actuator 1 further comprises transmission means 7 for transmitting the produced stepped rotary movements Rs to an output shaft 8, which may be mounted by means of bearings 9 to the frame 5. The rotation units 2 are connected to each other by means of the transmission means 7 so that the produced rotation steps are transmitted between them and further to the output shaft 8. The produced axial movements L of the cylinders 3 are not transmitted from one rotation unit to another. Thus, the rotation units 2 are series connected regarding the produced rotary movements. The cylinders 3 of the rotation units 2 may be independently controlled, whereby varying stepped rotary movements may be generated. The rotations units 2 of the rotary actuator 1 may be similar or they may all be configured to produce specific angular displacement.

Figure 2:
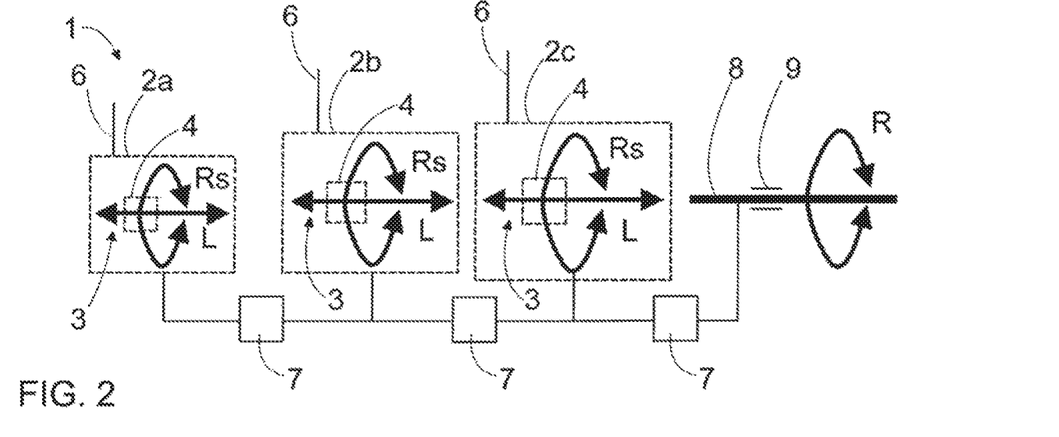
FIG. 2 is a schematic side view of another rotary actuator comprising several differing rotation units.

FIG. 2 illustrates that the rotary actuator 1 may be composed of two or more different rotation units 2a-2c. The station units 2 may be provided with pressure medium cylinders 3 having differing stroke lengths and they may also be configured to produce linear forces having different magnitude, for example. Alternatively, or in addition to, the converting means 4 of the rotation units 2 may be structurally different and/or their converting ratios may be different.

As it is shown in FIG. 1 the rotation units 2 may be arranged axially on the same line. Furthermore, the rotation units 2 may be located successively. In FIG. 2 the rotation units 2 are not located inside one single frame. A further difference in FIG. 2 is that the cylinders 3 of the rotation units 2 may be of single-acting type, whereby pressurized fluid flow fed through one pressure medium duct 6 to a pressure space of the cylinder is enough to produce the first axial movement. The second axial movement in the opposite direction may be produced by means of a spring element, such as a mechanical spring or pressurized gas. Thus, the pressure medium cylinder 3 of the rotation unit may in some cases be a piston accumulator, too.

Figure 3:
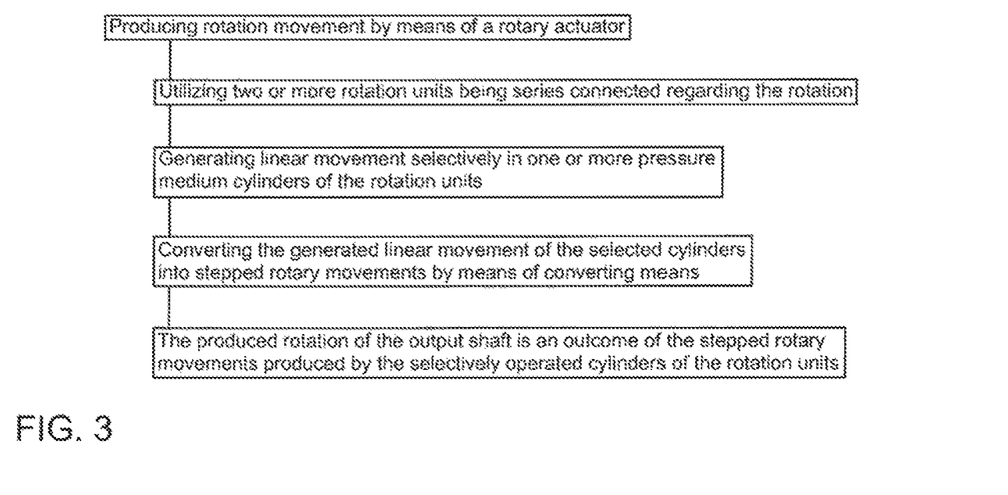
FIG. 3 is a schematic diagram showing basic features of producing stepped rotatory movements by means of the disclosed rotary actuator.

FIG. 3 is a schematic diagram showing basic features of producing stepped rotatory movements by means of the disclosed rotary actuator.

Figure 4:
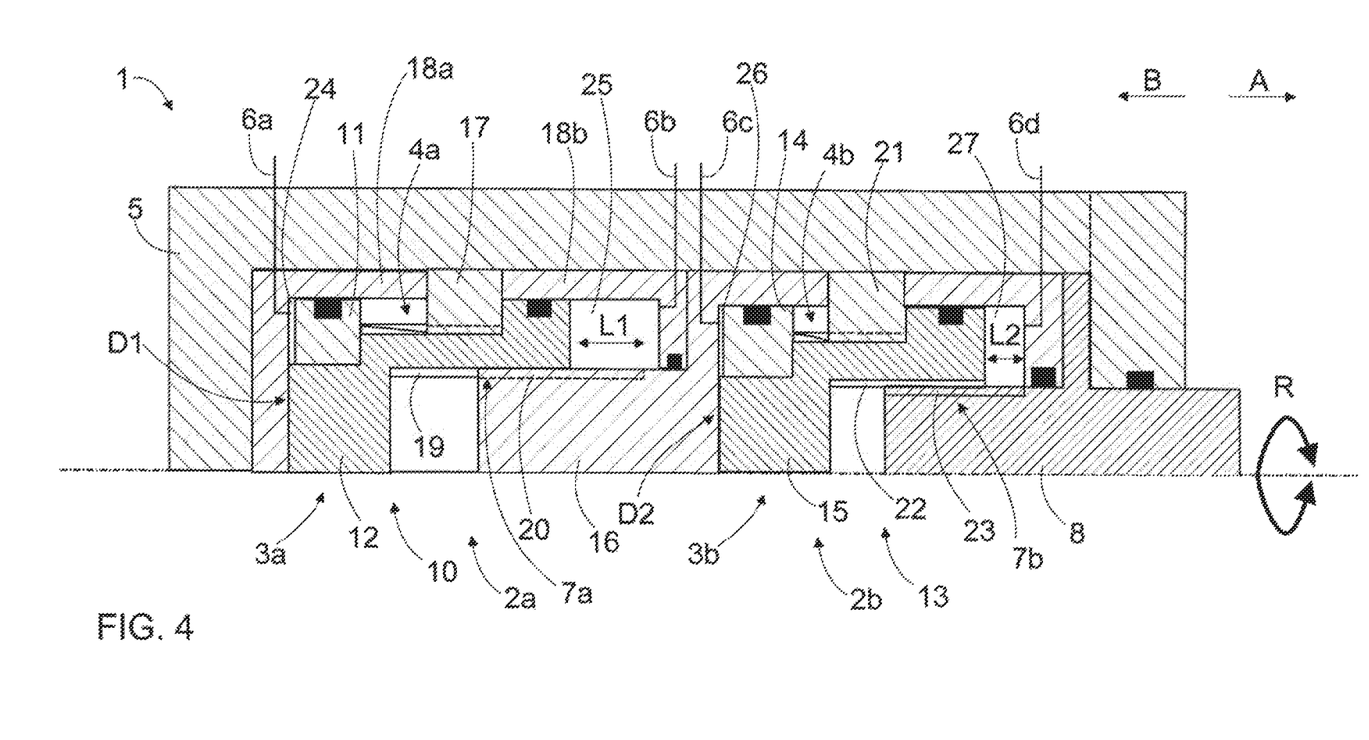
FIG. 4 is schematic and sectional half-view of a rotary actuator comprising two rotation units.

FIG. 4 shows a structure of an embodiment of the rotary actuator 1. The rotary actuator 1 comprises two rotation units 2a and 2b both provided with pressure medium cylinders 3a, 3b. A first cylinder 3a comprises a first piston assembly 10 composed of a piston ring 11 and a sleeve 12, and correspondingly, a second cylinder 3b comprises a second piston assembly 13 composed of a piston ring 14 and a sleeve 15. Alternatively, the piston assemblies 10 and 13 may be substituted by pistons having one-piece structures. Between the piston assemblies 10 and 13 is a spindle 16, which serves as a rotation transmitting element when the rotation units 2a and 2b are actuated. The spindle 16 is supported to be axially immovable. Between the first piston assembly 10 and the frame 5 are first converting means 4a and between spindle 16 and the second piston assembly 13 are second converting means 4b.

An outer surface of the sleeve 12 may comprise helical grooves or corresponding surfaces provided with pitch angles. The frame 5 may comprise a first mating element 17 arranged in contact with the helical groove and being supported immovably. The mating element 17 may be supported to the frame 5 by means of support elements 18a and 18b. Alternatively, the mating element 17 may be fastened directly to the frame 5. The mating element 17 may also comprise helical grooves matching the helical grooves of the sleeve 12, or alternatively, the mating element 17 may be a pin-like element arranged to be against the helical grooves of the sleeve 12. The first converting means 4a may then comprise at least one set of helical grooves or surfaces and at least one mating element or surface. Relative axial movement between the mating surfaces of the converting means 4a generates rotation.

An inner surface of the sleeve 12 may comprise axial splines 19 arranged to transmit rotation through axial splines 20 of the spindle 16. The axial splines 19 and 20 do not transmit axial forces, whereby they allow axial movement of the first piston assembly 10 relative to the spindle 16, which is supported to be axially immovable.

The second converting means 4b may comprise helical grooves, splines or surfaces on an outer surface of the sleeve 15 of the second piston assembly 13. The spindle 16 may comprise a second mating element 21 arranged in engagement with the helical grooves of the sleeve 15. The mating element 21 may transmit rotation movement generated in the first rotation unit 2a to the second piston assembly 3b. The second mating element 21 is arranged to be rotated with the spindle 16. The mating element 21 may be a separate piece mounted to the spindle 16 or alternatively it may be integrated to structural part of the spindle 16. Between the second piston assembly 13 and the output shaft 8 are rotation transmitting surfaces. An inner surface of the sleeve 15 may comprise axial spines 22 being in engagement with axial splines 23 of the output shaft 8. The axial spline 22, 23 allow the second piston assembly 13 to move axially relative to the output shaft 8, which is supported to the frame 5 axially immovably. In FIG. 4 the axial splines 19 and 20 serve as first rotation transmitting elements 7a, and the axial splines 22 and 23 serve as second rotation transmuting elements 7b.

Pressurized fluid may be fed through a pressure duct 6a to a first pressure space 24 of the first rotation unit 2a thereby causing the first piston assembly 10 to move m direction A towards the output shaft 8. Produced axial movement L1 is converted to angular displacement or stepped rotation of the first piston assembly 10 by means of the first converting means 4a. The rotary movement is transmitted through the first transmission means 7a to the spindle 16 and further from the spindle 16 via second converting means 4b to the second piston assembly 13, and finally through the second transmission means 7b to the output shaft 8. When only the first rotation unit 2a is actuated the second converting means 4b only transmit the rotation without any conversion because no relative axial movement occurs between the sleeve 15 and the second mating element 21. The first rotation unit 2a may be actuated to the opposite direction by discharging the fluid from the first pressure space 24 and directing pressurized fluid through duct 6b to a second pressure space 25. Then, the first piston assembly 10 moves in direction B and angular displacement in an opposite direction is generated for the output shaft 8. The second rotation unit 2b may be actuated by directing pressurized fluid through duct 6c into a third pressure space 26 causing the second piston assembly 3b to produce axial movement L2 in direction A. Stroke length of the second piston assembly 13 may be shorter than the one of the first piston assembly 3a. As can be seen in FIG. 4, the length of L2 may be half of L1. The produced axial movement L2 of the second piston assembly 13 is convened to rotation by means of the second converting means 4b and the generated rotation is transmitted via rotation transmission means 7b to the output shaft 8. The second piston assembly 13 may drive in direction 8 for producing angular displacement in the opposing direction. The solution disclosed in FIG. 4 has two cylinders 3a and 3b both of them having two extreme positions, whereby four different angular displacements may be produced. However, it is possible to combine three, four or even more rotation units and to utilize the disclosed structural principle of FIG. 4.

Further, in FIG. 4 the first piston or piston assembly 10 has a first diameter D1 and pressure surface area, and the second piston or piston assembly 13 has a second diameter D2 and pressure surface area. In FIG. 4 the diameters D1 and D2 are substantially equal as well as pressure surface areas. However, it is possible to dimension surface areas of the pistons to have different size. This may be needed when the converting means 4a and 4b have different converting ratios and there exists a need to compensate for torque produced by the rotation units 2a and 2b.

Figure 5:
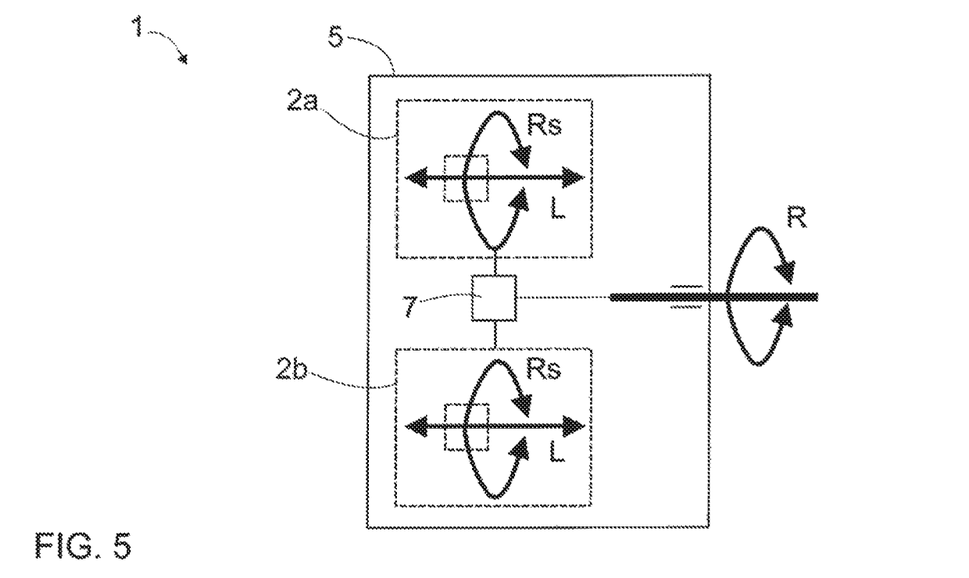
FIG. 5 is a schematic side view of a feasible rotary actuator comprising two or more parallel rotation units.

FIG. 5 discloses a rotary actuator 1 comprising a first rotation unit 2a and a second rotation unit 2b arranged parallel relative to each other. The parallel assembly of the rotation units may be useful when length of the rotary actuator needs to be limited.

Figure 6:
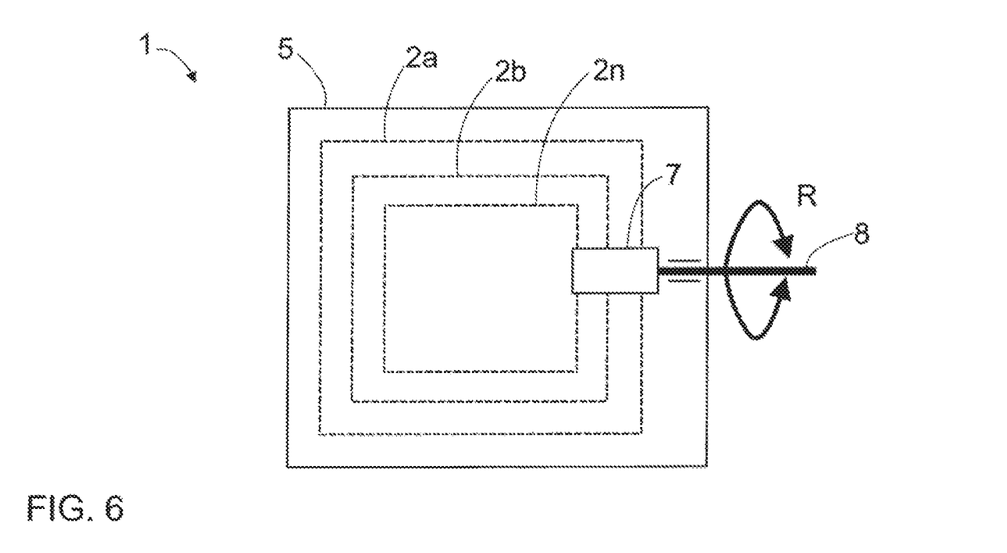
FIG. 6 is a schematic side view of a feasible rotary actuator comprising several rotation units arranged within each other.

FIG. 6 discloses a rotary actuator 1 comprising several rotation units 2a-2n arranged within each other. Thanks to this embodiment length of the actuator may be short.

Figure 7:
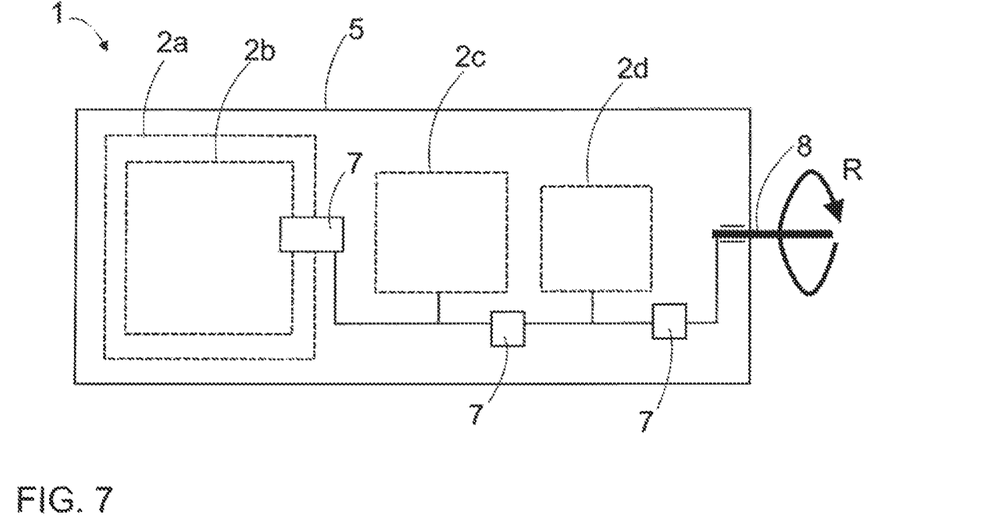
FIG. 7 is a schematic side view of a feasible rotary actuator comprising at least two rotation units arranged within each other, and further comprising one or more rotation units arranged consecutively.

FIG. 7 discloses a feasible rotary actuator 1 comprising a set of at least two rotation units arranged within each other and a set of at least two rotation units arranged one after each other. Thus, the solution of FIG. 7 may be a combination of constructional principles of solutions of FIGS. 1 and 6.

Figure 8:
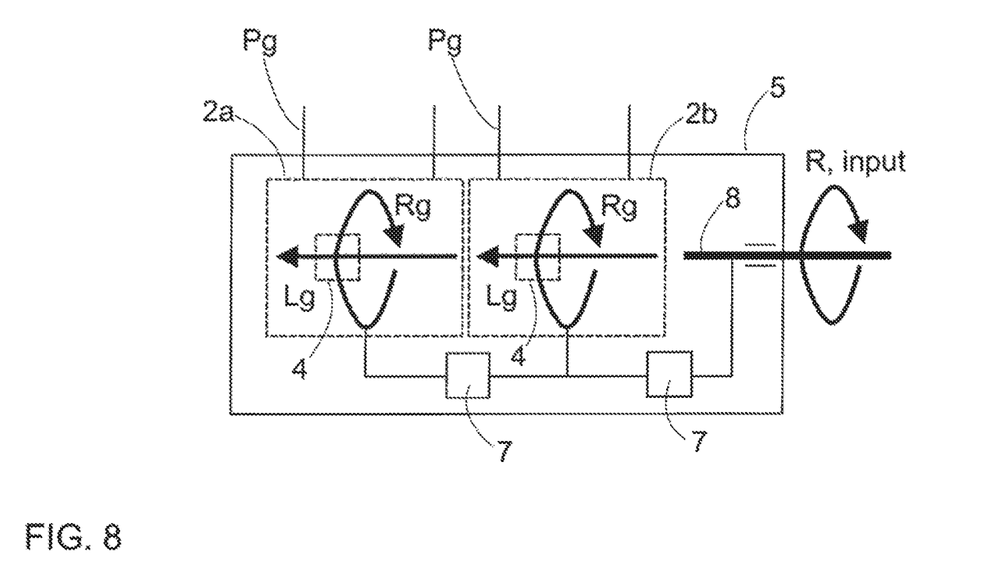
FIG. 8 is a schematic side view of a converting actuator capable to convert input rotary movement into pressure energy, and vice versa.

FIG. 8 is a schematic side view of a converting actuator capable to convert input rotary movement into pressure energy and vice versa. The basic structure, features and components of the converting actuator may correspond to any one of the above disclosed embodiments of the rotary actuator. Rotary movement and torque may be input to the output shaft 8 and may be transmitted through transmission means 7 to two or more rotation units 2a, 2b. Thus, the rotation units 2 may generate angular displacement Rg. The rotation units may convert the generated angular displacement Rg into axial movements Lg by means of converting arrangements 4. The rotation units 2 may comprise cylinders or other suitable pressure medium devices for producing linear movement, and on the other hand, for generating pressure Pg when the input rotation is arranged to cause linear movement in the pressure medium cylinder or corresponding device. The generated pressure Pg may be stored in e pressure accumulator connected to a pressure space of the cylinder. Further, it may be possible to substitute the cylinder of the rotation unit with a piston accumulator. In this solution the input rotary energy may be converted into pressure energy and may be converted back into rotary movement.

The drawings and the related description are only intended to illustrate the idea of the invention. In its details, the invention may vary within the scope of the claims.

The invention claimed is:

1. A rotary actuator for producing rotation, comprising:
   a frame;
   at least one output shaft; and
   at least a first rotation unit and a second rotation unit, which are series connected regarding generating rotation in the at least one output shaft;

the first rotation unit having a first pressure medium cylinder for providing first axial movement and a first converting arrangement for converting the first axial movement to a first angular displacement;

the second rotation unit having a second pressure medium cylinder for providing second axial movement and a second converting arrangement for converting the second axial movement to a second angular displacement;

control means for directing pressure medium selectively to the first pressure medium cylinder and/or the second pressure medium cylinder for operating selected ones of the first rotation unit and/or the second rotation unit individually and/or simultaneously for producing stepped angular displacement, the stepped angular displacement including the first angular displacement, the second angular displacement, or a combination of the first angular displacement and the second angular displacement; and a transmission for transmitting the stepped angular displacement to the at least one output shaft, whereby the rotation is an outcome of the stepped angular displacement; and wherein the first pressure medium cylinder is configured to have two operational states consisting of a first operational position that is a contracted state and a second operational position that is an extended state without any intermediate operational state between the contracted state and the extended state and so that the first rotation unit generates two first angular displacements; and wherein the second pressure medium cylinder is configured to have two operational states consisting of a first operational position that is a contracted state and a second operational position that is an extended state without any intermediate operational state between the contracted state and the extended state and so that the second rotation unit generates two second angular displacements.

2. The rotary actuator as claimed in claim 1, wherein:

operation of each of the first pressure medium cylinder and the second pressure medium cylinder of the rotary actuator is independently controllable.

3. The rotary actuator as claimed in claim 1, wherein:

the first pressure medium cylinder and the second pressure medium cylinder of the rotary actuator are arranged successively on a same axial line.

4. The rotary actuator as claimed in claim 1, wherein the first angular displacement does not equal the second angular displacement.

5. The rotary actuator as claimed in claim 4, wherein:

the first pressure medium cylinder is dimensioned and the second pressure medium cylinder is dimensioned so that the stroke length of the first pressure medium cylinder differs from the stroke length of the second pressure medium cylinder.

6. The rotary actuator as claimed in claim 4, wherein:

the first converting arrangement is configured to perform the conversion according to a first converting ratio;

the second converting arrangement is configured to perform the conversion according to a second converting ratio; and the first conversion ratio does not equal the second conversion ratio.

7. The rotary actuator as claimed in claim 6, wherein:

the first rotation unit is configured to generate a first torque and the second rotation unit is configured to generate a second torque, the first torque being equal to the second torque; and to compensate for the first conversion ratio not being equal the second conversion ratio, a dimensional size of a surface area of working pressure surface of the first pressure medium cylinder is adjusted relative to the first conversion ratio and a dimensional size of a surface area of working pressure surface of the second pressure medium cylinder is adjusted relative to the second conversion ratio.

8. The rotary actuator as claimed in claim 1, comprising:

at least one more rotation unit, each additional rotation unit configured to generate an angular displacement that differs from an angular displacement generated by another rotation unit of the rotary actuator.

9. The rotary actuator as claimed in claim 1, wherein:

the frame includes one single frame configured to house both the first rotation unit and the second rotation unit.

10. The rotary actuator as claimed in claim 1, wherein:

the transmission includes plural transmissions;

the frame includes at least two frame parts configured such that each frame part is houses at least one of the first rotation unit and the second rotation unit;

each frame part is arranged axially one after the other; and an individual transmission is located between successive frame parts.

11. A method for producing rotation with a rotary actuator, the method comprising:

individually operating the first rotation unit and the second rotation unit of the rotary actuator recited in claim 1;

producing the first axial movement via the first pressure medium cylinder by feeding and discharging pressure medium to and away from at least one pressure space of the first pressure medium cylinder and/or producing the second axial movement via the second pressure medium cylinder by feeding and discharging pressure medium to and away from at least one pressure space of the second pressure medium cylinder;

converting the first axial movement to the first angular displacement and/or converting the second axial movement to the second angular displacement;

transmitting the first angular displacement and/or the second angular displacement to the at least one output shaft; and controlling operation of the first rotation unit and the second rotation unit individually for producing the rotation of the output shaft.

12. A rotary actuator, comprising:

a first rotation unit including a first pressure medium cylinder configured for first axial movement and first converting means for converting the first axial movement to a first angular displacement;

a second rotation unit including a second pressure medium cylinder configured for second axial movement and second converting means for converting the second axial movement to a second angular displacement; and a first transmission and a second transmission in an arrangement so that:

the first transmission is connected in series with the second transmission;

the first transmission is for transmitting the first angular displacement to an output shaft and/or the second rotation unit;

the second transmission is for transmitting the second angular displacement to the output shaft; and the arrangement allows for independent and/or simultaneous operation of the first pressure medium cylinder and the second pressure medium cylinder;

wherein:

the first pressure medium cylinder is configured to have two operational states consisting of a first operational position that is a contracted state and a second operational position that is an extended state without any intermediate operational state between the contracted state and the extended state and so that the first rotation unit generates two first angular displacements; and the second pressure medium cylinder is configured to have two operational states consisting of a first operational position that is a contracted state and a second operational position that is an extended state without any intermediate operational state between the contracted state and the extended state and so that the second rotation unit generates two second angular displacements.

13. The rotary actuator as claimed in claim 12, comprising:

a third rotation unit including a third pressure medium cylinder configured for third axial movement and third converting means for converting the third axial movement to a third angular displacement;

a third transmission for transmitting the third angular displacement to the output shaft; and wherein the first transmission transmits the first angular displacement to the output shaft, the second rotation unit, and/or the third rotation unit;

wherein the second transmission transmits the second angular displacement to the output shaft and/or the third rotation unit; and wherein the first transmission, the second transmission, and the third transmission are connected in series with each other.

14. The rotary actuator as claimed in claim 12, wherein:

the first pressure medium cylinder includes a first piston assembly having a first stroke length;

the second pressure medium cylinder includes a second piston assembly having a second stroke length; and the first stroke length differs from the second stroke length.

15. The rotary actuator as claimed in claim 12, wherein:

the first converting means converts the first axial movement to the first angular displacement via a first conversion ratio;

the second converting means converts the second axial movement to the second angular displacement via a second conversion ratio; and the first conversion ratio differs from the second conversion ratio.

16. The rotary actuator as claimed in claim 12, wherein the first rotation unit is connected in series with the second rotation unit.

17. The rotary actuator as claimed in claim 12, wherein the first rotation unit is connected in parallel with the second rotation unit.

18. The rotary actuator as claimed in claim 12, wherein:

the first rotation unit is configured to be within the second rotation unit; or the second rotation unit is configured to be within the first rotation unit.

19. The rotary actuator as claimed in claim 12, comprising:

control means for independent control of the first rotation unit and the second rotation unit.

* * * * *